United States Patent [19]

Funahashi

[11] Patent Number: 5,636,188
[45] Date of Patent: Jun. 3, 1997

[54] DATA TRANSMISSION CIRCUIT FOR DISK STORAGE APPARATUS

[75] Inventor: Takeshi Funahashi, Saitama, Japan

[73] Assignee: Sony Corporation, Tokyo, Japan

[21] Appl. No.: 341,486

[22] Filed: Nov. 17, 1994

[30] Foreign Application Priority Data

Nov. 19, 1993  [JP]  Japan ................................ 5-290931

[51] Int. Cl.⁶ .................................................. G11B 17/22
[52] U.S. Cl. ............................ 369/32; 369/33; 369/124
[58] Field of Search ............................. 369/32, 33, 54, 369/58, 124

[56] References Cited

U.S. PATENT DOCUMENTS

| | | | |
|---|---|---|---|
| 5,237,553 | 8/1993 | Fukushima | 369/58 |
| 5,257,248 | 10/1993 | Ogasawara | 369/32 |
| 5,276,662 | 1/1994 | Shaver, Jr. | 369/32 |

*Primary Examiner*—David C. Nelms
*Assistant Examiner*—Son Mai
*Attorney, Agent, or Firm*—Limbach & Limbach L.L.P.

[57] ABSTRACT

A data transmission apparatus includes first and second interfaces for interfacing a data signal in response to a command from an external device. First and second interface controllers control the first and second interfaces, respectively. A memory temporarily stores the data signal. A first controller is connected to the first and second interfaces and to a second controller. The first interface controller generates a first table and supplies the first table to the second controller. The second controller determines whether the command causes data transfer using the first table, and controls the first controller to analyze the command if the command causes data transfer. The first controller generates memory information including an access position and source and destination addresses. A designated source interface controller stores the data signal in the memory, then a designated destination interface controller reads the data signal from the memory. A method of transmitting data includes the steps of receiving a command from an external device with a first interface, supplying the command to the first interface controller for controlling the first interface, generating a first table, determining whether the command causes data transfer using on the first table, analyzing the command if the command causes data transfer, generating access position information with respect to memory based on the first table and source and destination addresses, storing the data signal in the memory based upon the source address, and reading the data signal from the memory and outputting the data signal based upon the destination address.

6 Claims, 14 Drawing Sheets

DATA TRANSMISSION CIRCUIT FOR DISK STORAGE APPARATUS

BACKGROUND OF THE INVENTION

The present invention relates to a method of and an apparatus for transmitting data into and out of a computer or the like, suitable for use in a disk drive such as a hard disk drive, an optical disk drive, a magnetooptical disk drive, or the like.

Disk drives such as optical disk drives, which are connected to computers or the like for storing various data produced by the computers on disks, have widely been used as data input/output apparatus in the prior art.

FIG. 1 of the accompanying drawings shows functional blocks of software functions stored in an optical disk drive. Processing operation of a CPU of the optical disk drive will be described below with reference to FIG. 1. Since the software functions are represented by respective functional block in FIG. 1, the software functions are given hardware titles in FIG. 1.

As shown in FIG. 1, the software system includes a system controller P1 for controlling the system in its entirety, a memory controller P2 for controlling a work memory, an I/O (input/output) driver P3 for inputting and outputting input/output data P4, P5, P6 with tasks TASK#1, TASK#2, TASK#3, and a data transfer buffer P11 for transferring data.

The system controller P1 is a software task referred to as TASK#0 as a main manager for controlling the system while determining whether the I/O driver P3 is normal or not, setting a DMA control circuit, or monitoring data as they are inputted into and out of the work memory and a buffer memory. The tasks TASK#1, TASK#2, TASK#3 are carried out in an SCSI (Small Computer Systems Interface) environment. The memory controller P2 is a memory manager as a so-called test driver.

A multitask monitor P8 is a software function for operating the tasks TASK#1, TASK#2, TASK#3 apparently simultaneously, and has two features. One of the features is that each software module can be designed uniquely without concern over various factors. The other feature is that a software sequence corresponding to an abruptly occurring event can easily be generated and modified because each of the tasks TASK#1, TASK#2, TASK#3 is of a structure which keeps a waiting condition until an event corresponding to each of the tasks occurs. Due to these features, the multitask monitor P8 is employed in many devices. Denoted at P9-1, P9-2, P9-3 are hardware-initiated interrupt routines.

Operation of the optical disk drive, particularly the software system shown in FIG. 1, will be described below with reference to FIGS. 2 and 3.

FIGS. 2 and 3 show an operation sequence caused by the system controller P1 shown in FIG. 1 and an operation sequence of the optical disk drive caused by the I/O driver P3 shown in FIG. 1.

In a step S1, the system controller P1 calls the I/O driver to cause the I/O driver to wait for a command. Specifically, when the system controller P1 enters a state of receiving a command, the system controller P1 calls the I/O driver P3 directing it to wait for a command. Then, the I/O driver P3 enters a state of waiting for a command in a step S2.

When the I/O driver P3 receives a command, the system controller P1 analyzes the command in a step S3, and control goes to step S4 or step S5 depending on the analyzed command. Specifically, the system controller P1 analyzes a command from a host computer, and if the command is a data transfer command, then control goes to step S4, and if the command is not a data transfer command, then control goes to step S5.

In step S4, a data transfer memory is acquired, after which control proceeds to step S6. That is, preparations are made in order to be able to use a buffer memory.

In step S5, a command other than the data transfer command is processed. Thereafter, control returns to step S1.

In step S6, a task of a source I/O driver is started, and DMA (direct memory access) transfer is started between the data transfer memory and an I/O, after which control goes to step S8 shown in FIG. 3. That is, the I/O driver P3 (in FIG. 1) effects DMA transfer to the buffer memory.

In step S7, the DMA transfer is started in the I/O driver P3, and an interrupt indicating the end of the DMA transfer is awaited. After step S7, control goes to step S8.

In step S8, a task of the destination I/O driver is started, and DMA transfer is started between the data transfer memory and an I/O, after which control goes to step S9. That is, when the system controller P1 (FIG. 1) recognizes that a certain amount of data is stored in the buffer memory, the system controller P1 starts a task of the I/O driver P3.

In step S9, the DMA transfer is started, and an interrupt indicating the end of the DMA transfer is awaited. Specifically, the destination I/O driver P3 starts DMA transfer from the buffer memory to an I/O, i.e., to an input or output side. When the DMA transfer is ended, the I/O driver P3 informs the system controller P1 of the end of the DMA transfer. The system controller P1 then waits for an end of the data transfer in step S10. If the data transfer ends, then control goes to step S11, and if the data transfer does not end, then control goes to step S6 shown in FIG. 2. Specifically, since all data may not be transferred in one transfer cycle, the system controller P1 controls source and destination I/O drivers P3 to effect DMA transfer while monitoring the DMA transfer of the source and destination I/O drivers P3 until all data to be transferred from the destination I/O driver P3 are transferred from the buffer memory to a destination I/O by the destination I/O driver P3.

In step S11, an end status is given to the I/O drivers, after which control goes back to step S1 shown in FIG. 2. That is, a status indicative of the end of the DMA transfer is given to the source I/O driver P3 and the destination I/O driver P3.

In step S12, the I/O driver P3 reports the result to the I/O which has issued the command. Thereafter, control returns to step S1 shown in FIG. 2. That is, the host computer is informed of the end of the data transfer.

When the processing of the command is finished, the system controller P1 waits for a command again.

In order to carry out the above operation effectively, the tasks TASK#1, TASK#2, TASK#3 are assigned respectively to the I/O data P4, P5, P6, respectively, and the multitask monitor P8 shown in FIG. 1 is operated.

The conventional data input/output apparatus described above suffers the following problems:

First, if there are a number of I/O drivers P3 which receive commands, then the software sequence for the system controller shown in FIG. 1 becomes more complex as the number of I/O drivers P3 increases. Inasmuch as it is necessary to monitor whether there is a command from another I/O while a command received by the software sequence for the system controller is being processed, the software sequence for the system controller is essentially of a complex nature.

Secondly, the functional level of the entire system is constrained by the designing capability because the system controller P1 is required to operate while determining the type (source or destination, for example) and status of the tasks of the I/O drivers P3.

The third problem is that when a bug occurs in a certain I/O driver P3, or the software sequence needs to be modified for a functional expansion, no correct change can be made unless the designer understands the overall software sequence.

According to the fourth problem, if a plurality of designers are assigned to design and develop a software system for one storage apparatus, then the software system cannot be designed and developed unless locations for exchanging information between software sequences, including I/O driver interfaces, are clearly indicated.

The fifth drawback is that when a new system is constructed, it has to be newly designed in its entirety.

According to the sixth disadvantage, the number of I/Os that can be handled is limited because the greater the number of tasks that can be controlled by the multitask monitor P8, the slower the processing speed of the system.

According to the seventh problem, since tasks of several I/O drivers cannot be generated independently of each other, all tasks of I/O drivers have to be generated in relation to each other.

SUMMARY OF THE INVENTION

It is therefore an object of the present invention to provide a method of and an apparatus for inputting and outputting data, which allow a system controller software sequence to be simplified in structure and to operate without having to determine the type and status of tasks of I/O drivers at all times, to permit a change to be made without understanding an entire software sequence when a bug occurs in an I/O driver or the software sequence needs to be modified for a functional expansion, to allow one software system to be divided and designed without clearly indicating locations for exchanging data between software sequences, to make it possible to construct a new system through only modifications, to prevent the number of I/Os that can be handled from being limited, and to allow tasks of I/O drivers to be generated independently of each other.

According to the present invention, there is provided a data transmission circuit comprising a first interface for interfacing a data signal in response to a command from at least an external device, first interface control means for controlling the first interface, a second interface for interfacing at least a data signal, second interface control means for controlling the second interface, memory means for temporarily storing the data signals, first control means connected to the first interface and the second interface, and second control means connected to the first control means, the first interface control means including means for generating a first table and supplying the first table to the second control means based on a command supplied to the first interface, the second control means including means for determining whether the command causes data transfer based on the first table, and controlling the first control means to analyze the command if the command causes data transfer, the first control means also including means for generating memory information including access position information with respect to the memory means based on the first table, first address information with respect to one of the first and second interfaces which serves as a source of a data signal, and second address information with respect to one of the first and second interfaces which serves as a destination of a data signal, one of the first and second interface control means which corresponds to the one of the first and second interfaces which serves as a source of a data signal including means for supplying a data signal to and storing the data signal in the memory means based on the first address information and the access position information, one of the first and second interface control means which corresponds to the one of the first and second interfaces which serves as a destination of a data signal including means for reading the data signal from the memory means and outputting the data signal through the one of the first and second interfaces based on the second address information and the access position information.

According to the present invention, there is also provided a method of transmitting data, including the steps of (a) receiving a command from at least an external device with a first interface, (b) supplying the command to first interface control means for controlling the first interface, (c) generating and supplying a first table to a second control means with the first interface control means, (d) determining, with the second control means, whether the command causes data transfer based on the first table, (e) analyzing, with first control means, the command if the command causes data transfer as determined in step (d), (f) generating, with the first control means, access position information with respect to memory means based on the first table, first address information with respect to one of the first interface and a second interface which serves as a source of a data signal, and second address information with respect to one of the first and second interfaces which serves as a destination of a data signal, (g) storing, with one of the first interface control means and second interface control means which corresponds to the one of the first and second interfaces which serves as a source of a data signal, a data signal in the memory means based on the first address information and the access position information, and (h) reading, with one of the first and second interface control means which corresponds to the one of the first and second interfaces which serves as a destination of a data signal, a data signal from the memory means and outputting the data signal through the one of the first and second interfaces based on the second address information and the access position information.

DETAILED DESCRIPTION OF THE PREFERRED EMBODIMENT

Figure 1:
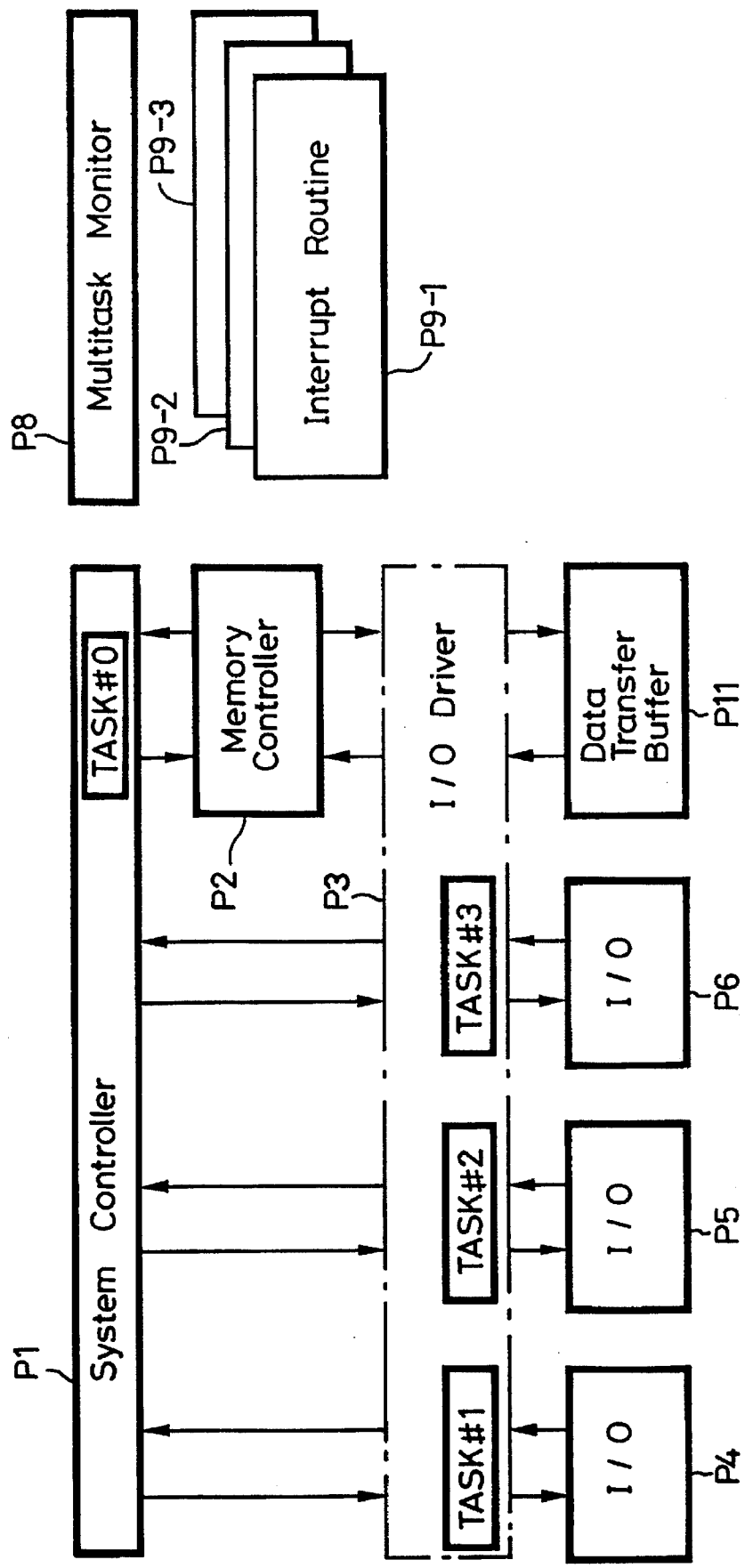
FIG. 1 is a functional block diagram of a prior art data input/output apparatus.
Figure 2:
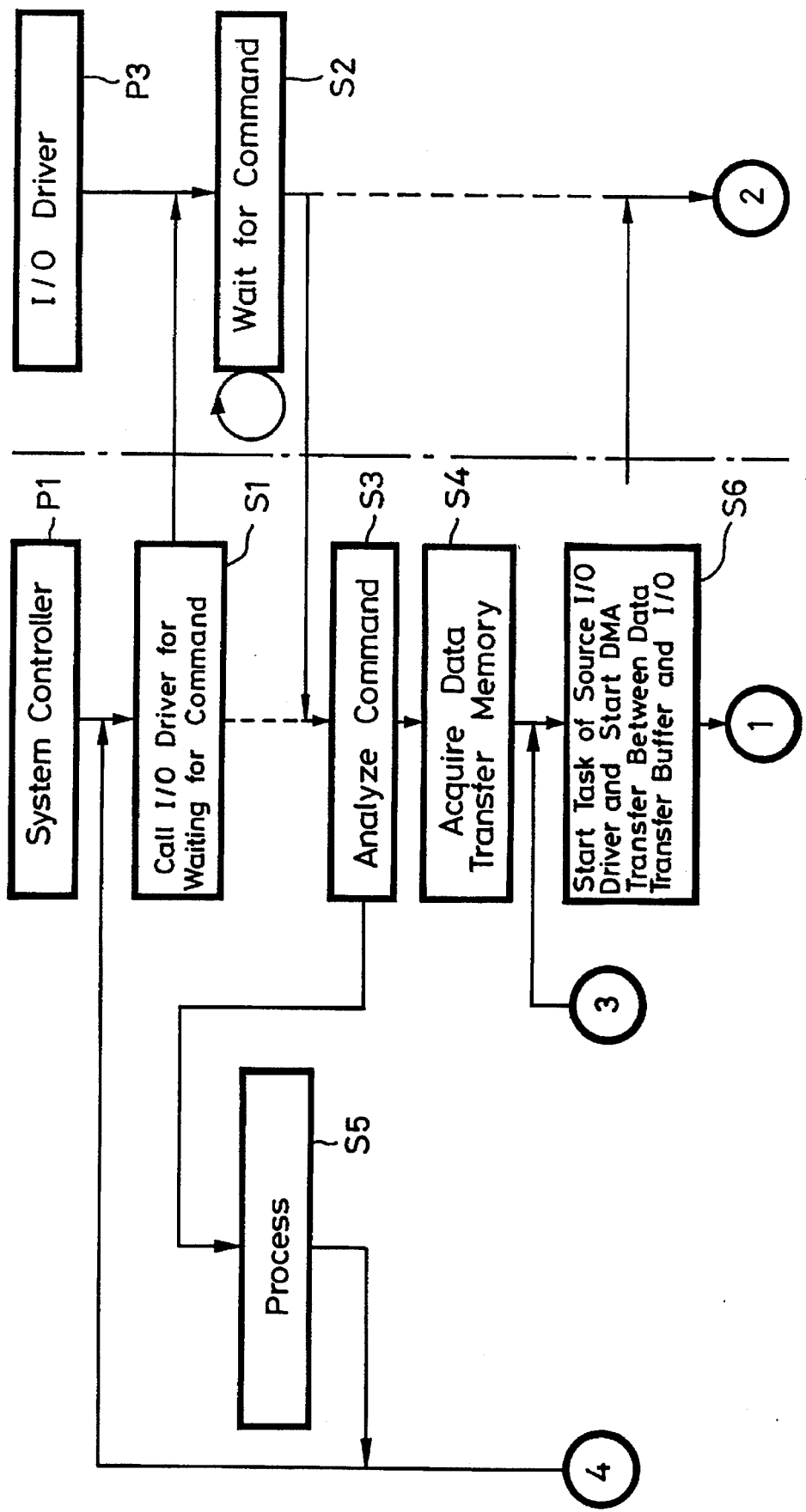
FIGS. 2 and 3 are a flowchart of operation of the prior art data input/output apparatus.
Figure 3:
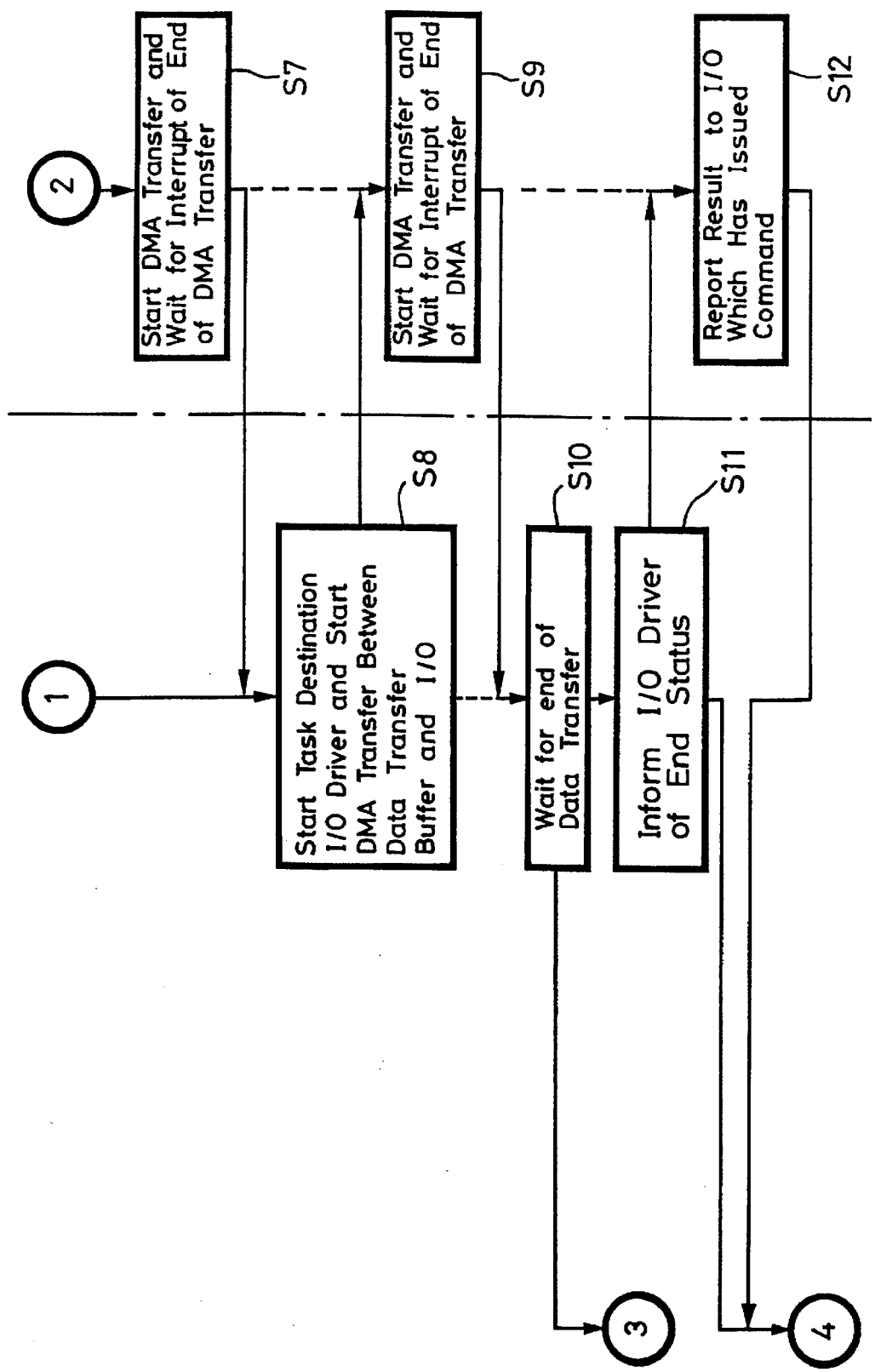

A data input/output apparatus according to the present invention will be described below with reference to FIGS. 4 through 14.

A system which incorporates the data input/output apparatus according to the present invention will be described below with reference to FIG. 5. In the system shown in FIG. 5, a host computer 41 is connected to an optical disk drive 42 through a SCSI (Small Computer Systems Interface) control circuit 48, and a debugger 40 is connected to the optical disk drive 42 through an SIO (Serial I/O) control circuit 47, such as an RS-232C interface. The debugger 40 serves to check software sequences of the optical disk drive 42.

The present invention is also applicable to a system in which there are a plurality of devices for giving commands to the optical disk drive 42.

The optical disk drive 42 will be described in detail below. In the optical disk drive 42 shown in FIG. 5, a CPU 43 is connected to a bus 44 which comprises an address bus, a data bus, and a control bus. To the bus 44, there are also connected a ROM 45 which stores a system software program, described later on with reference to FIG. 4, and various parameter data, a RAM 46 which primarily serves as a work memory for the CPU 43, the SIO control circuit 47 as a serial interface, the SCSI control circuit 48 as a SCSI interface, a DMA (Direct Memory Access) control circuit 49, a drive control circuit 51 for actuating the optical disk drive 42, and a mechanism control circuit 52 for actuating mechanical components, e.g., rotating an optical disk 53 and moving an optical head (not shown). A buffer memory 50 is connected to the DMA control circuit 49.

When a read command is issued from the host computer 41 to the SCSI control circuit 48, the CPU 43 controls the drive control circuit 51 to control the mechanism control circuit 52 for moving the optical head to seek desired data recorded on the optical disk 53 and then reading the data from the optical disk 53.

The data thus read from the optical disk 53 are supplied through the mechanism control circuit 52, the drive control circuit 51, and the DMA control circuit 49 to the buffer memory 50 in which they are stored. Successive amounts of data stored in the buffer memory 50 are read therefrom by the DMA control circuit 49, and supplied through the SCSI control circuit 48 to the host computer 41.

When a write command is issued from the host computer 41 to the SCSI control circuit 48, data to be recorded are supplied from the host computer 41 through the SCSI control circuit 48 and the DMA control circuit 49 to the buffer memory 50 in which they are stored.

The CPU 43 controls the drive control circuit 51 to control the mechanism control circuit 52 to move the optical head. At the same time, the data stored in the buffer memory 50 are read therefrom by the DMA control circuit 49, and supplied through the drive control circuit 51 and the mechanism control circuit 52 to the optical head, which records the supplied data on the optical disk 53.

System software functions composed of a program stored in the ROM 45 of the optical disk drive 42 shown in FIG. 5 and some of the hardware arrangement shown in FIG. 5 (whose functions may be stored in the ROM 45) will be described below with reference to FIG. 4.

Figure 4:
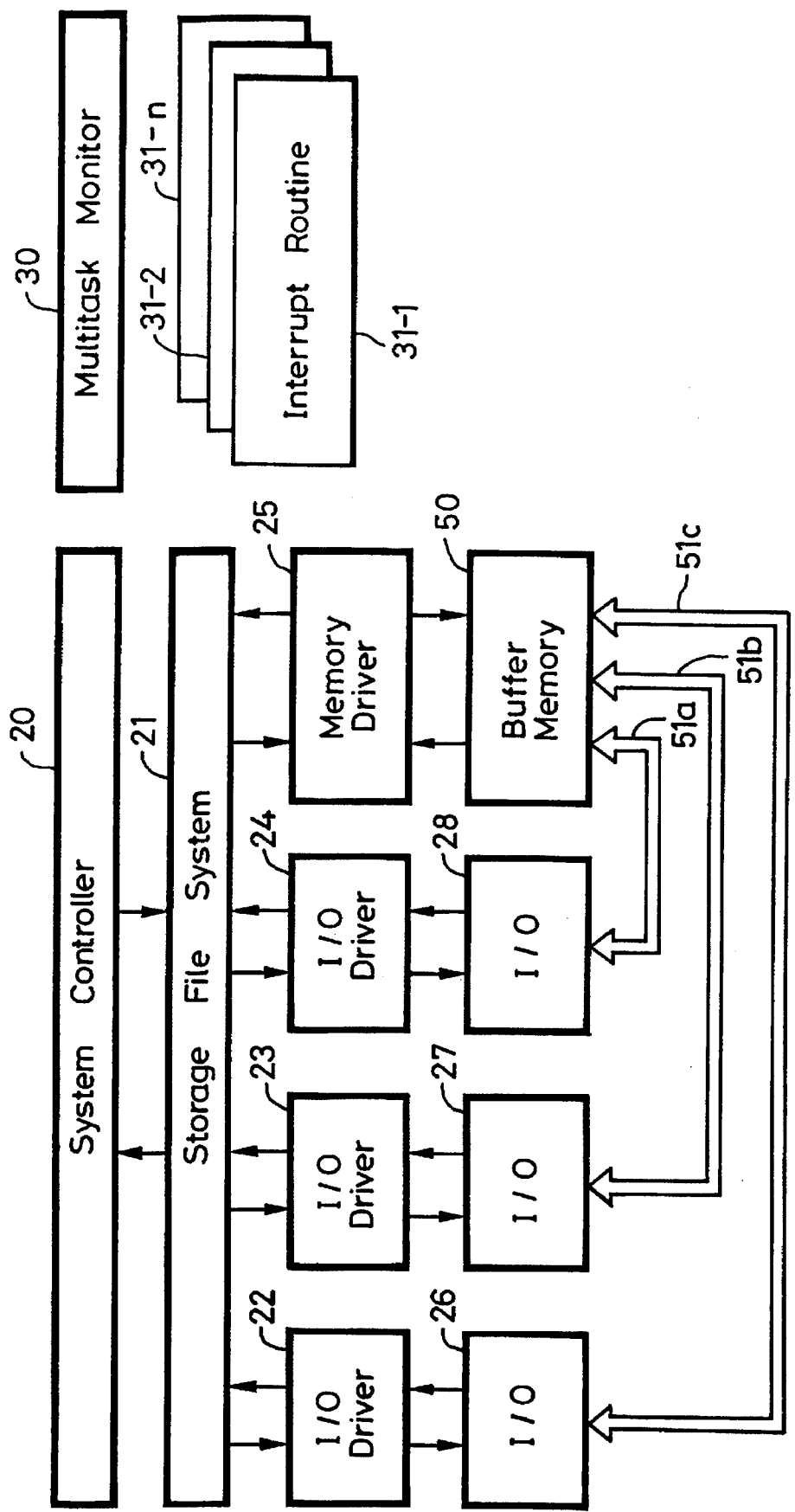
FIG. 4 is a functional block diagram of the preferred embodiment of the present invention.
Figure 5:
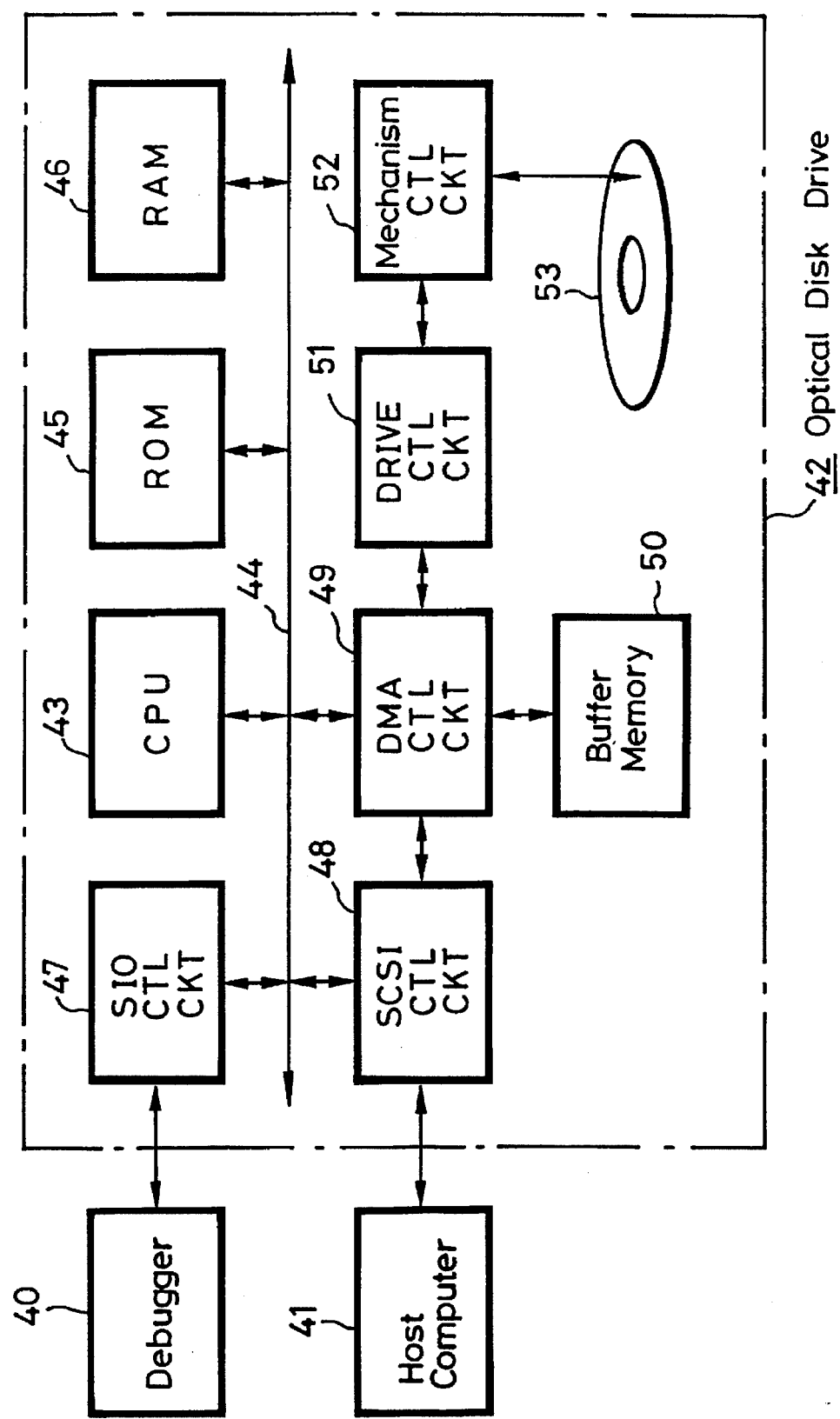
FIG. 5 is a block diagram of a system which incorporates the embodiment preferred of the present invention.

In FIG. 4, the system software functions include a system controller 20 serving as a main manager for controlling the entire system while monitoring data transfer into and out of the buffer memory 50 and the RAM 46, a storage file system (SFS) 21 serving as a drive controller, I/O drivers 22, 23, 24 serving as device drivers corresponding to input/output functions of the SCSI interface, the I/O drivers 22, 23, 24 corresponding to the SCSI control circuit 48 shown in FIG. 5, a memory driver 25 for controlling the buffer memory 50 with the DMA control circuit 49 shown in FIG. 5, the buffer memory 50 for data transfer, I/O data 26, 27, 28 to be inputted and outputted by the respective I/O drivers 22, 23, 24, a multitask monitor 30 for controlling a plurality of tasks, and interrupt routines 31-1, 31-2, . . . 31-n.

While there are three I/O drivers 22, 23, 24 in FIG. 4, they are shown for illustrative purpose only.

Figure 6:
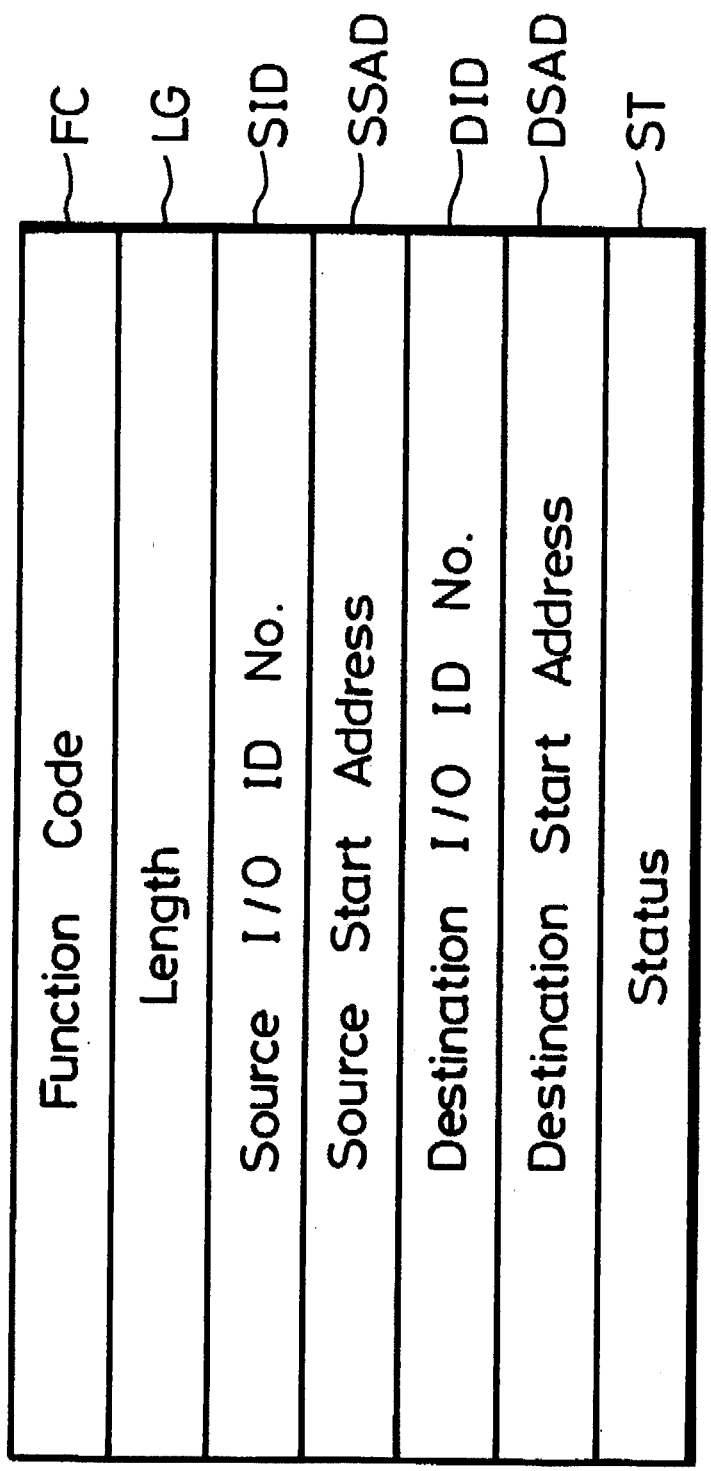
FIG. 6 is a table for a command driver to recognize and convert commands into SFS-based codes in the preferred embodiment of the present invention.

When each of the I/O drivers 22, 23, 24 shown in FIG. 4 receives a SCSI command, it generates a table (hereinafter referred to as a first table) CDB-1 as shown in FIG. 6. As shown in FIG. 6, the first table CDB-1 is composed of the function code FC, a length LG indicative of a data length, a source I/O identification number SID indicative of the source I/O, the source start address SSAD, the destination I/O identification number DID indicative of the destination I/O, a destination start address DSAD, and the status ST indicative of error information.

Figure 7:
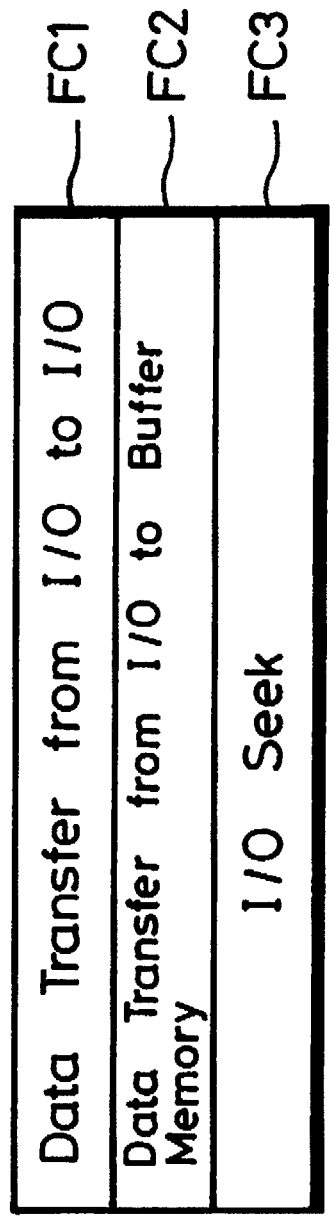
FIG. 7 is a table illustrative of the types of function codes in the preferred embodiment of the present invention.

The function code FC shown in FIG. 6 is set to either one of function codes FC1, FC2, FC3 shown in FIG. 7. More specifically, when the function code FC shown in FIG. 6 is a function code FC1, it means that data is transferred from one I/O device to another I/O device, i.e., between the host computer 41 and the optical disk drive 42 or between the debugger 40 and the optical disk drive 42. When the function code FC shown in FIG. 6 is a function code FC2, it means that data is transferred between an I/O device and the buffer memory 50 such as when reading fault information from the optical disk 53. When the function code FC shown in FIG. 6 is a function code FC3, it simply indicates a seek mode, and no data transfer is carried out.

The SFS 21 shown in FIG. 4 analyzes the function code FC in the first table CDB-1 shown in FIG. 6, and executes a data transfer operation when the function code FC is a data transfer command, i.e., when the function code FC is FC1. At this time, the SFS 21 acquires a certain area in the buffer memory 50 for data transfer. Then, the SFS 21 puts information of the acquired area in the buffer memory 50 in an MAB (Memory Allocation Block). Simultaneously with the generation of the MAB, the SFS 21 generates a second table CDB-2 shown in FIG. 8. Since the MAB is information corresponding to the used area in the buffer memory 50, the same information is used for the MAB by source and destination sides. However, different second tables CDB-2 are used for the source and destination sides. The second table for the I/O driver 22, 23, or 24 which serves as a source driver is represented by CDB-2(S), and the second table for the I/O driver 22, 23, or 24 which serves as a destination driver is represented by CDB-2(D).

Figure 8:
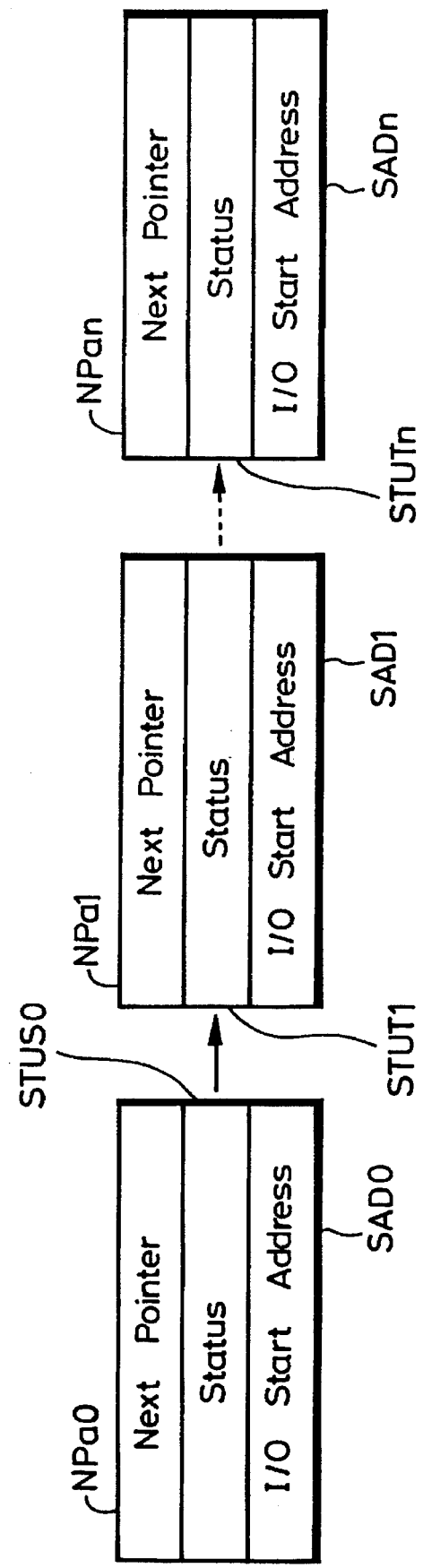
FIG. 8 is a diagram illustrative of command descriptor blocks for carrying out data transfer between a data transfer buffer and an I/O in the preferred embodiment of the present invention.

In FIG. 8, a pointer indicating the next second table CDB-2, i.e., a pointer pointing to the next pointer NPa1, is put in the next pointer NPa0, and a pointer indicative of a next second table CDB-2, i.e., a pointer to pointing to the next pointer NPa2 (not shown), is put in the next pointer NPa1. A status STUS indicates error information, and an I/O start address SAD indicates a start address for data transfer in an I/O.

Figure 9:
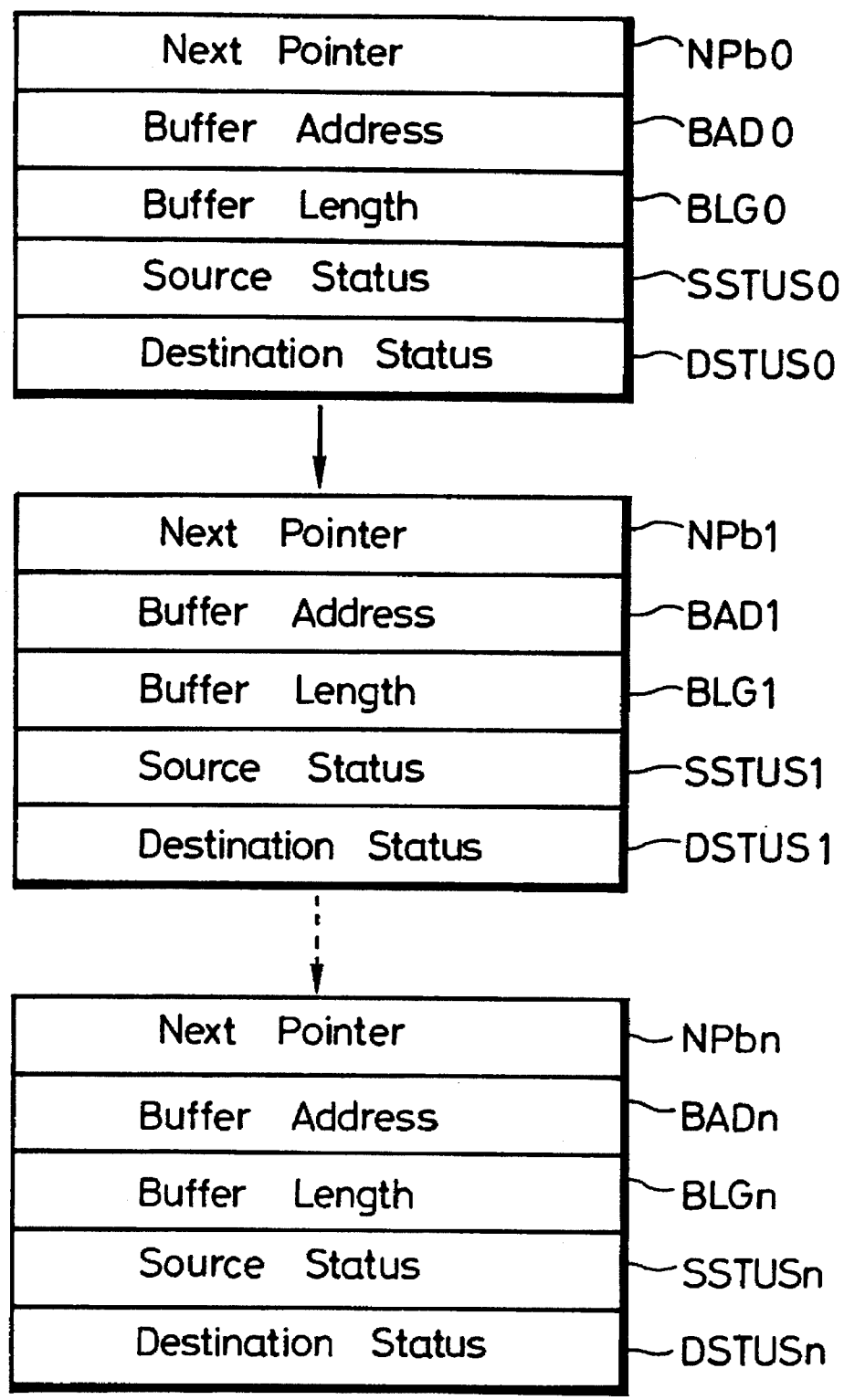
FIG. 9 is a diagram illustrative of memory allocation blocks in the preferred embodiment of the present invention.

FIG. 9 shows an example of the memory allocation blocks MAB. As shown in FIG. 9, each memory allocation block MAB includes a next pointer NPbn indicative of a next information position, a buffer address BADn indicative of a start address for accessing the buffer memory, a buffer length BLGn indicative of a data length for accessing the buffer memory, a source status SSTUSn indicative of error information of a source side, and a destination status DSTUSn indicative of error information of a destination side.

Figure 10:
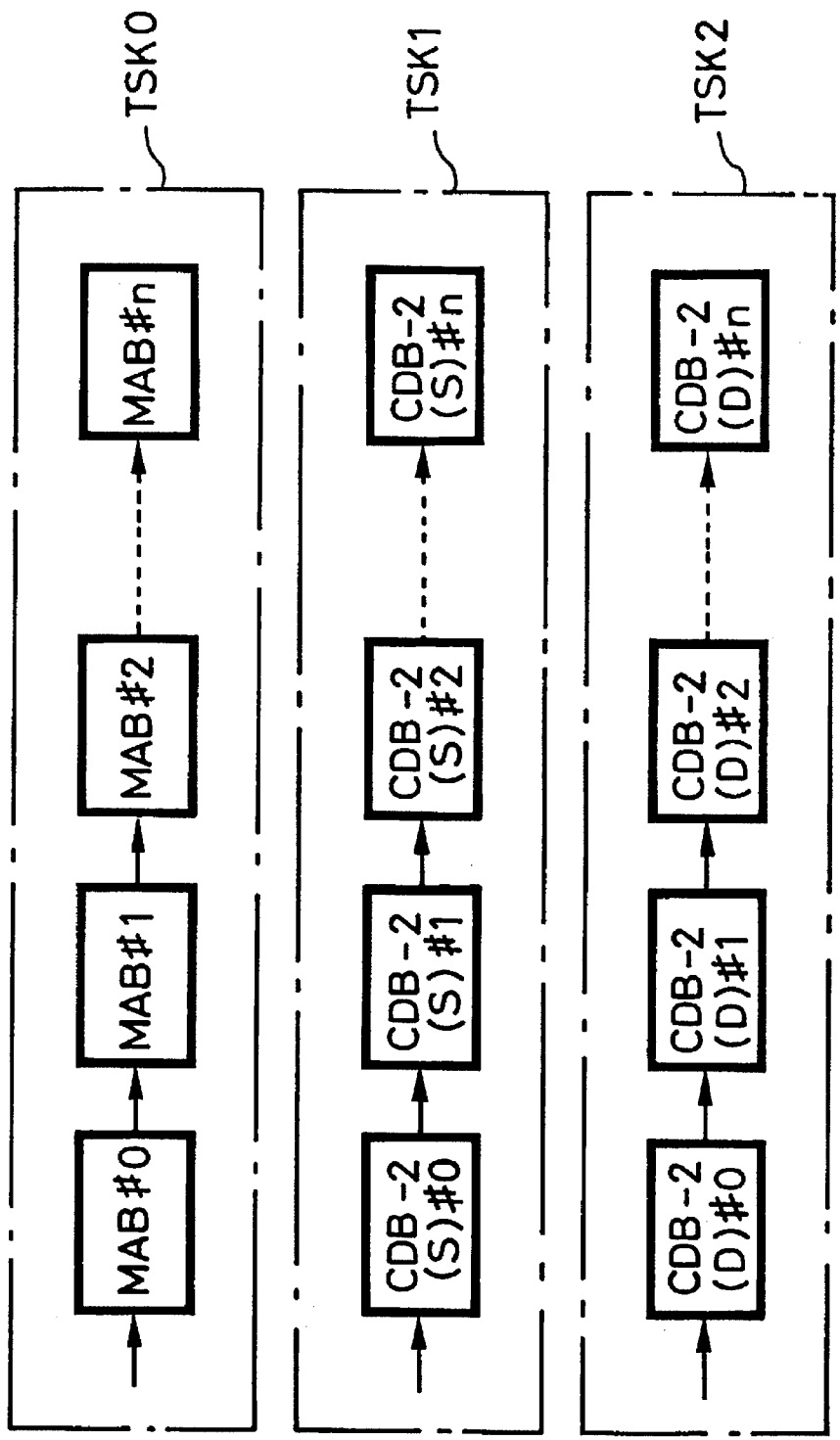
FIG. 10 is a diagram illustrative of multitasks in the preferred embodiment of the present invention.

Principles of data transfer operation will be described below with reference to FIG. 10. In FIG. 10, TSK0, TSK1, TSK2 represent tasks. MAB#0, MAB#1, MAB#2, . . . MAB#n in the task TSK0 represent the memory allocation blocks MAB shown in FIG. 9, CDB-2 (S)#0, CDB-2 (S)#1, CDB-2 (S)#2, . . . CDB-2 (S)#n in the task TSK1 represent the second table CDB-2 (for source I/Os) such as in FIG. 8, and CDB-2 (D)#0, CDB-2 (D)#1, CDB-2 (D)#2, . . . CDB-2 (D)#n in the task TSK2 represent the second table CDB-2 (for destination I/Os) such as in FIG. 8.

The task TSK0 is a process for generating the memory allocation block MAB, the second table CDB-2 (S) for source I/Os, and the second table CDB-2 (D) for destination I/O2 until data transfer is finished. The task TSK1 is a process for effecting direct memory access based on the memory allocation block MAB and the second table CDB-2 (S) for source I/Os which have been received. The task TSK2 is a process for effecting direct memory access based on the memory allocation block MAB and the second table CDB-2 (D) for destination I/Os which have been received.

Operation of the optical disk drive 42 according to the system software functions shown in FIG. 4 will be described below with reference to FIGS. 11 and 12.

Figure 11:
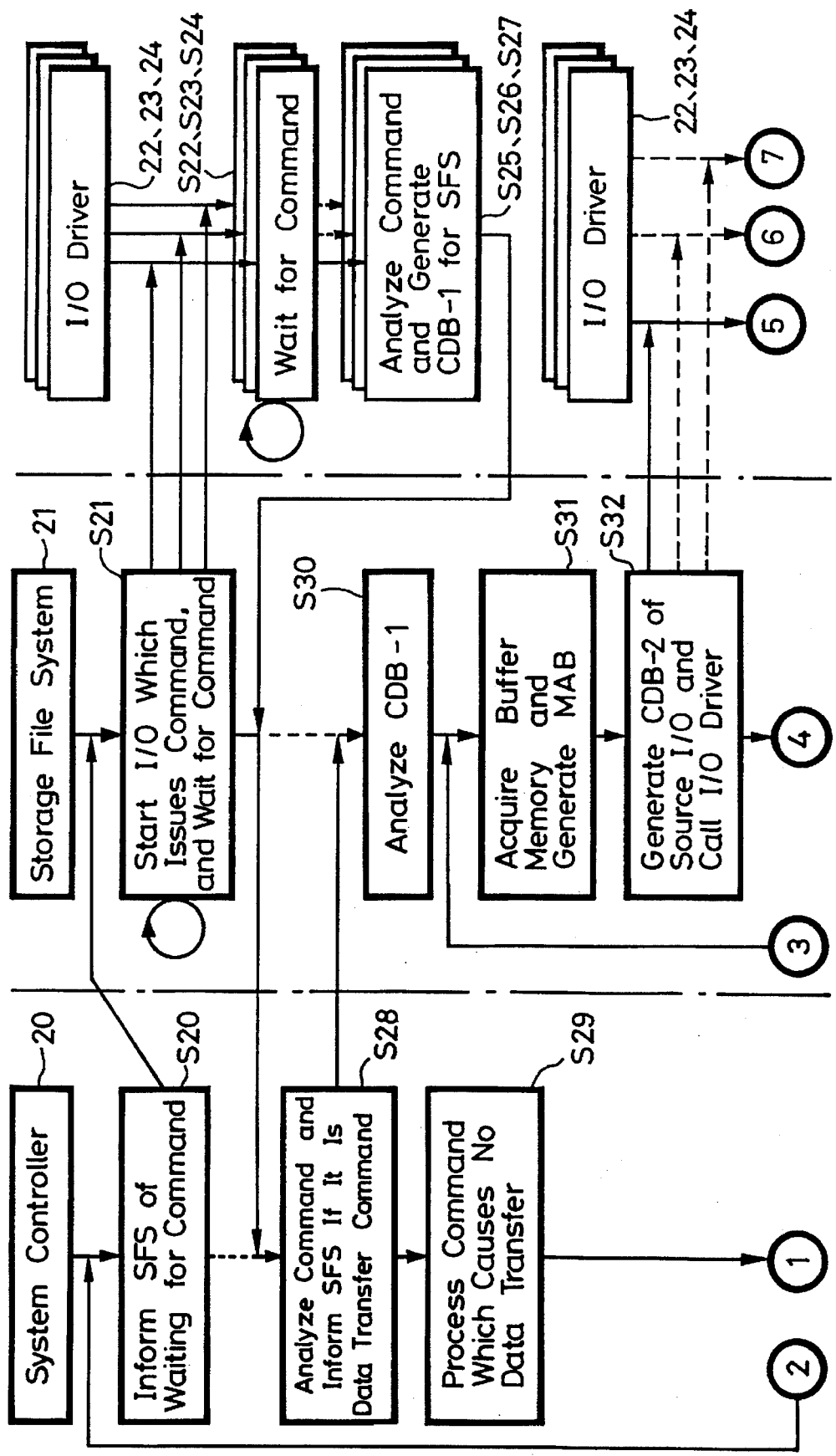
FIGS. 11 and 12 are a flowchart of operation of the preferred embodiment of the present invention.
Figure 12:
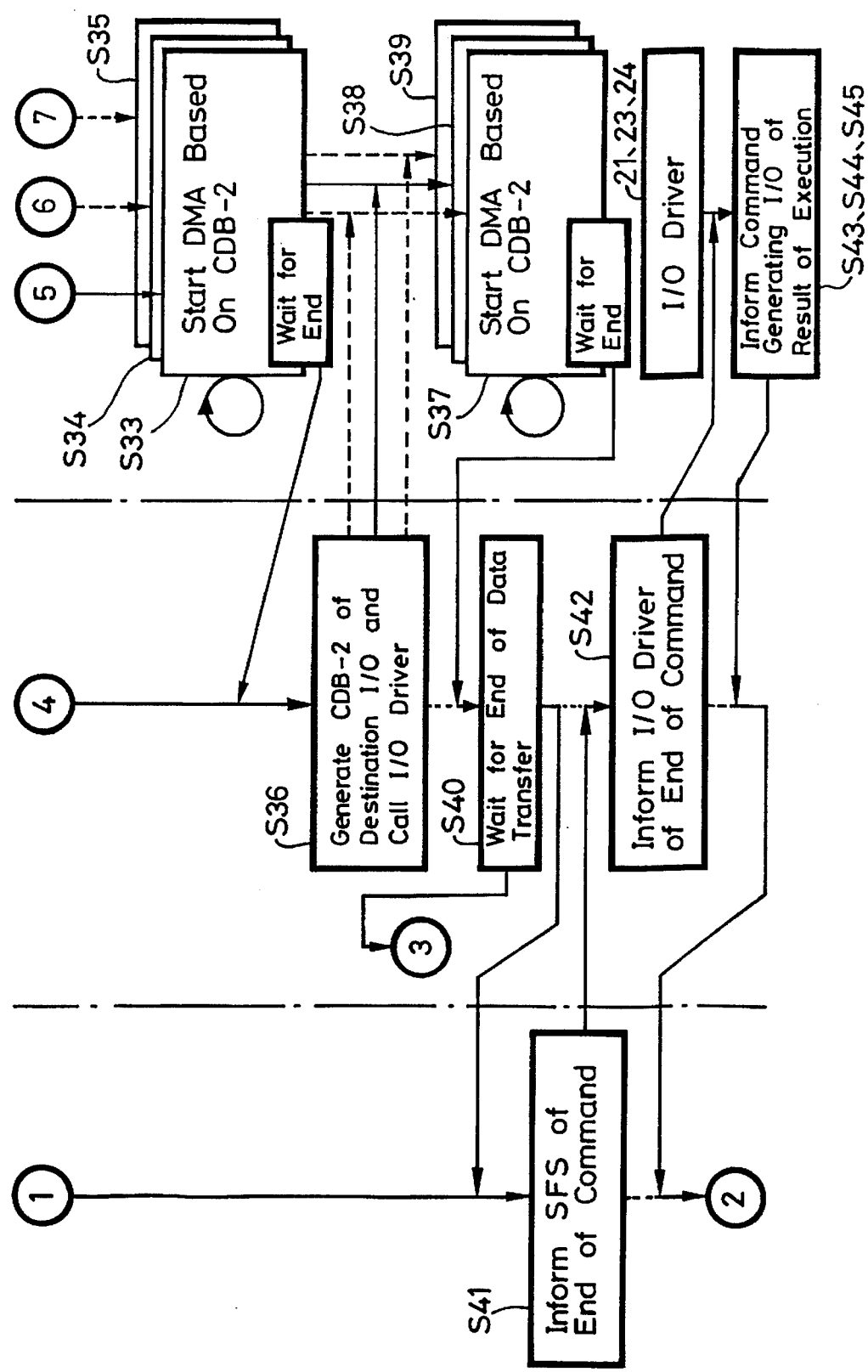

In FIGS. 11 and 12, those steps shown below the system controller 20 represent processing steps carried out by the system controller 20, those steps shown below the SFS 21 represent processing steps carried out by the SFS 21, and those steps shown below the I/O drivers 22, 23, 24 represent processing steps carried out by the I/O drivers 22, 23, 24.

When the system controller 20 enters a state capable of receiving a command, the system controller 20 informs the SFS 21 of being capable of waiting for a command in step S20.

In a step S21, the SFS 21 starts an I/O driver which issues a command directed to the I/O drivers 22, 23, 24, and waits for a command response. The I/O driver which issues a command is an I/O driver for driving an I/O connected to the host computer 41 or the debugger 40. If there are a plurality of I/O drivers that are to be started, the I/O drivers are started using the multitask monitor 30.

In steps S22, S23, S24, the I/O drivers 22, 23, 24 which are started by the SFS 21 in the step S21 wait for a command. The I/O driver 22, 23, or 24 which first receives a command go to a corresponding step S25, S26, or S27 in which it generates the first table CDB-1 shown in FIG. 6. Specifically, the I/O driver determines whether the command supplied from the host computer 41 or the like is a read command or a write command, sets a function code, and sets a length based on supplied data length data, thereby generating the first table CDB-1. In the steps S25, S26, S27, the I/O drivers 22, 23, 24 supply the generated first table CDB-1 through the SFS 21 to the system controller 20. If the plural I/O drivers 22, 23, 24 have received a command, then the I/O driver 22, 23, or 24 which has received the command at the second time or later holds the command and is suspended temporarily. When the system controller 20 enters a state capable of waiting for a command again at the time the command received by the I/O driver 22, 23, or 24 at the earliest time is finished, the command held by the I/O driver 22, 23, or 24 which has been suspended temporarily becomes effective.

Setting of the first table CDB-1 will be described in specific detail below. When the SCSI control circuit 48 which serves as the I/O drivers 22, 23, 24 receives a command from the host computer 41, it analyzes the received command in the steps S25, S26, S27. For example, if the command from the host computer 41 is a command for reading 30 sectors of data from the optical disk 53, then the function code FC in the first table CDB-1 shown in FIG. 6 is set to the function code FC1 shown in FIG. 7, the length LG to information indicating "30", the source I/O identification number SID to identification number information indicating the drive control circuit 51, the source start address SSAD to information indicating "300", and the destination I/O identification number DID to identification number information indicating an I/O corresponding to SCSI. The destination start address DSAD is set to nothing as a start address for SCSI is not required to be defined.

If the function code FC is FC1, then it means that data is to be transferred from one I/O device to another I/O device e.g., data transfer between the host computer 41 and the optical disk 53. If the function code FC is FC2, it means that data is to be transferred from an I/O to the buffer memory 50, e.g., reading of fault information of the optical disk 53 from the optical disk 53. If the function code FC is FC3, then it means that a seek mode is entered for simply moving the optical pickup.

In a step S28, the system controller 20 analyzes the first table CDB-1, and if the command is a data transfer command, then the system controller 20 informs the SFS 21 of the data transfer command. Thereafter, the system controller 20 processes a command which causes no data transfer in a step S29. Specifically, the system controller 20 determines whether the function code FC in the first table CDB-1 is FC1 or FC2, and processes a command which causes no data transfer. After the step S29, control proceeds to a step S41 in which the system controller 20 informs the SFS 21 of the end of the processing of the command. Thereafter, control goes back to the step S20.

If the system controller 20 recognizes the command as a data transfer command in the step S28, then the system controller 20 informs the SFS 21 of the data transfer command. When the SFS 21 is instructed to transfer data by the system controller 20, control goes to a step S30 in which the first table CDB-1 is analyzed. Then, control goes to a step S31 in which a storage area in the buffer memory 50 which is required for data transfer is acquired. In the step S31, information of the acquired storage area in the buffer memory 50 is set in the memory allocation block MAB shown in FIG. 9.

Specifically, the SFS 21 refers to the length LG in the first table CDB-1 and acquires a storage area in the buffer memory 50. For example, if the SFS 21 acquires a storage area having a start address "100" and a storage capacity of 10 sectors, then the SFS 21 sets the buffer address BAD0 in the memory allocation block MAB#0 to information indicating the start address "100", and sets the buffer length BLG0 to information indicating the acquired storage capacity "10". If the command is the first command, then the memory allocation block MAB is represented by MAB#0.

The step S31 is followed by a step S32 in which the SFS 21 generates the second table CDB-2 (S)#0 for source I/Os. That is, the SFS 21 sets the value ("300" for example) of the source start address SSAD in the first table CDB-1 to the I/O start address SAD0 of the second table CDB-2 (S)#0, calls the I/O driver 22, 23, or 24 (source driver, i.e., a driver for the drive control circuit 51), and starts the task TSK#1.

The SFS 21 starts the task TSK#1 using the multitask monitor 30, and gives the memory allocation block MAB#0 and the second table CDB-2 (S)#0 to the source I/O driver 22, 23, or 24. Either one of the source I/O drivers 22, 23, 24 now effects direct memory access based on the memory allocation block MAB#0 and the second table CDB-2 (S)#0.

In a step S33, S34, or S35, either one of the I/O drivers 22, 23, 24 starts DMA based on the second table CDB-2 (S)#0. Specifically, when the task TSK#1 is started by the SFS 21, one of the I/O drivers 22, 23, 24 starts data transfer based on the source second table CDB-2 (S)#0, and the end of the data transfer is awaited.

In this embodiment, when the task TSK#1 is assigned to the drive control circuit 51, the I/O driver 22, 23, or 24 refers to the value "300" of the I/O start address SAD0 in the received second table CDB-2 (S)#0 and the value "10" of the buffer length BLG0 in the memory allocation block MAB#0, and executes the reading of 10 sectors of data from the address 300 of the optical disk 53.

Furthermore, the I/O driver 22, 23, or 24 controls the buffer memory 50 to write the data read from the optical disk 53 from a start address "100" by referring to the value "100" of the buffer address BAD0 in the memory allocation block MAB#0. When the writing of the data in the buffer memory 50 is completed, the I/O driver 22, 23, or 24 sets the source status SSTUS0 in the memory allocation block MAB#0 to a code indicating a normal end. Thereafter, the task TSK#2 is temporarily released. The data are transmitted through data lines 51a, 51b, 51c.

In a step S36, the destination second table CDB-2 (D)#0 is generated, and the corresponding I/O driver 22, 23, or 24 (destination driver, i.e., a driver for the SCSI control circuit 48) is called, and the task TSK#2 is started. Specifically, the SFS 21 generates the second table CDB-2 (D)#0 for destination I/Os, i.e., sets the value ("300" for example) of the source start address SSAD in the first table CDB-1 to the I/O start address SAD1, SAD2, ... or SADn in the second table CDB-2 (D)#0, and calls the I/O driver 22, 23, or 24.

Specifically, the SFS 21 starts the task TSK#2, and gives the memory allocation block MAB#0 and the second table CDB-2 (D)#0 to the destination I/O driver 22, 23, or 24. The destination I/O driver 22, 23, or 24 now effects direct memory access, i.e., data transfer from the buffer memory 50 to any one of the I/Os 26, 27, 28, based on the memory allocation block MAB#0 and the second table CDB-2 (D)#0.

In a step S37, S38, or S39, the I/O driver 22, 23, or 24 starts DMA based on the second table CDB-2 (D)#0. Specifically, when the task TSK#2 is started by the SFS 21, the I/O driver 22, 23, or 24 starts data transfer based on the destination second table CDB-2 (D)#0, and the end of the data transfer is awaited.

In this embodiment, when the task TSK#1 is assigned to the SCSI control circuit 48, the I/O driver 22, 23, or 24 first refers to the code of the source status SSTUS0 in the memory allocation block MAB#0. If it recognizes the code which has been referred to as indicating a normal end, then I/O driver 22, 23, or 24 refers to the value "100" of the buffer address BAD0 and the buffer length BLG0 in the received memory allocation block MAB#0, reads 10 sectors of data from the start address 100 of the buffer memory 50, and transfers the read data to the host computer 41.

When the transfer of the data from the buffer memory 50 to the host computer 41 is completed, I/O driver 22, 23, or 24 sets the destination status DSTUS0 in the memory allocation block MAB#0 to a code indicating a normal end. Thereafter, the task TSK#2 is temporarily released.

The SFS 21 determines whether the transfer of all data is ended or not in step S40. If not ended, then control returns to step S31 shown in FIG. 11 in which storage area in the buffer memory 50 that is required for data transfer is acquired. If the SFS 21 acquires a storage area having a start address "500" and a storage capacity of 10 sectors in the buffer memory 50, then the SFS 21 sets the buffer address BAD#1 in the memory allocation block MAB to information indicating the start address "500", and sets the buffer lengths BLG1, BLG3 to information indicating the acquired storage capacity "10". "1" is appended to the reference characters to indicate that the memory allocation block MAB is generated at the second time.

In step S32, a value "310" which has been advanced 10 sectors from the I/O start address SAD0 of the second table CDB-2 (S)#0 for source I/Os which has been set previously is set to produce a second table CDB-2 (S)#1. In the step S36, a value "310" which has been advanced 10 sectors from the I/O start address SAD#0 of the second table CDB-2 (D)#0 for destination I/Os which has been set previously is set to produce a second table CDB-2 (D)#1. In step S33, S34, or S35, the I/O driver 22, 23, or 24 starts DMA, i.e., effects data transfer, based on the second table CDB-2 (S)#1. In step S37, S38, or S30, the I/O driver 22, 23, or 24 starts DMA, i.e., effects data transfer, based on the second table CDB-2 (D)#1.

That is, in order to carry out data transfer until the length of the data to be transferred becomes the length whose value is set in the length LG in the first table CDB-1, the SFS 21 acquires the buffer memory 51 in the step S31, generates the second table CDB-2 (S) for source I/Os and calls the I/O driver 22, 23, or 24 in step S32, and generates the second table CDB-2 (D) for destination I/Os and calls the I/O driver 22, 23, or 24 in step S36. When the data transfer is ended in step S40, the SFS 21 informs the system controller 20 of the end of the data transfer.

In step S41, the system controller 20 informs the SFS 21 of the end of the command. Thereafter, control goes to step S42 in which the corresponding I/O driver 22, 23, or 24 is informed of the end of the command.

In steps S43, S44, S45, the I/O driver 22, 23, or 24 informs the I/O which generated the command of the result of execution. Subsequently, control returns to step S20 shown in FIG. 11 in which the system controller 20 waits for another command. Specifically, because of the task TSK#0, the I/O driver 22, 23, or 24 sets the status ST in the first table CDB-1 to the contents of the source status SSTUSn and the destination status DSTUSn in the memory allocation block MAB#n (n is 0, 1, 2, ... ), and then control returns to the system controller 20. The system controller 20 effects end processing based on the contents of the status ST in the first table CDB-1, and thereafter waits for a command.

Figure 13:
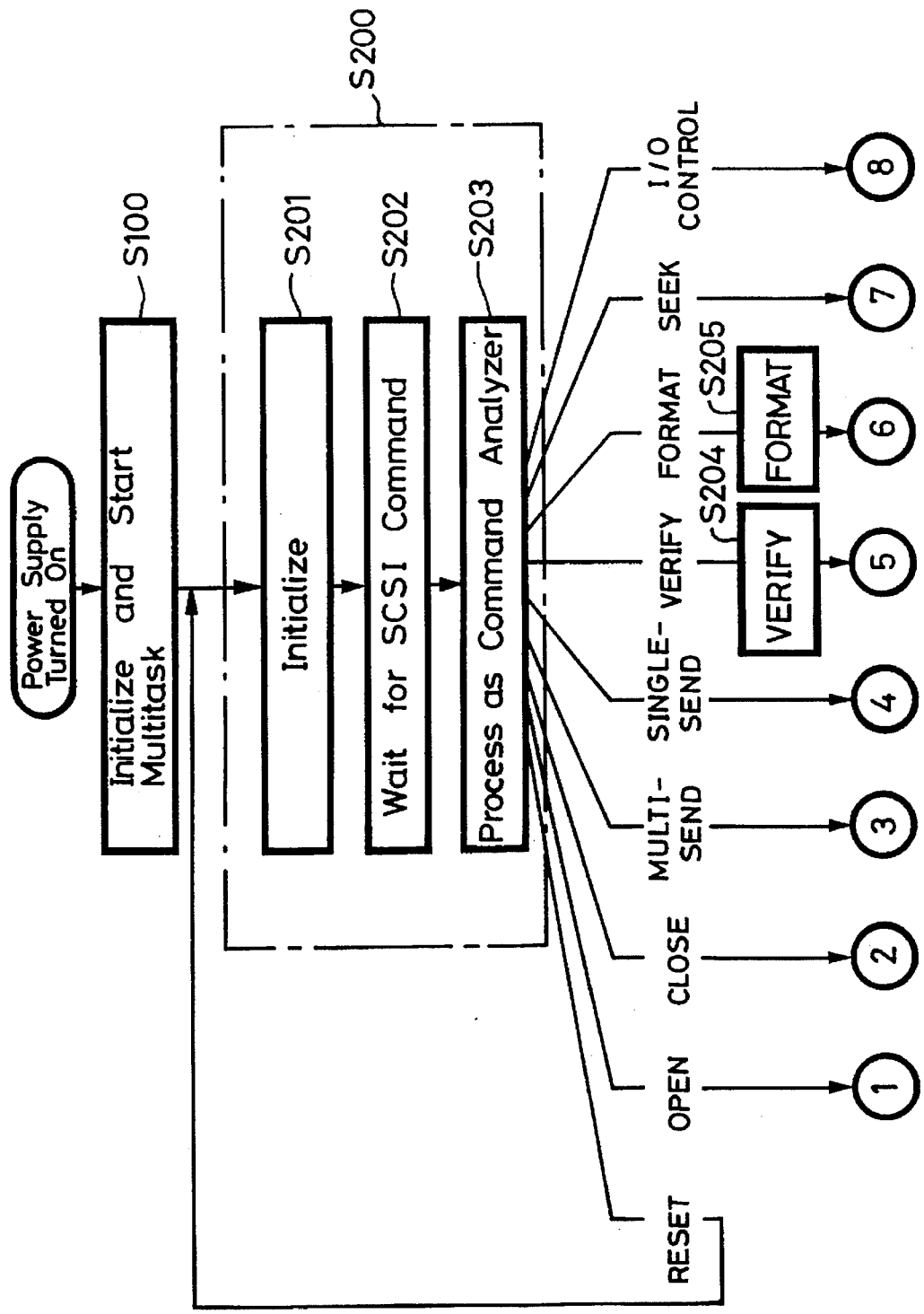
FIGS. 13 and 14 are a diagram illustrative of an optical disk drive employing a storage file system according to the preferred embodiment of the present invention.

Operation of the system composed of the optical disk drive 42 and the host computer 41 will further be described below with reference to FIGS. 13 and 14.

When the power supply of the optical disk drive 42 shown in FIG. 5 is turned on, it is initialized and a multitask process is started in a step S100. Specifically, the CPU 43 shown in FIG. 5 reads the system software program from the ROM 45, stores the system software program in main memory, e.g., the RAM 46, and initializes various circuits, e.g., clears the buffer memory 50.

In step S201 within step S200, the CPU 43 initializes the first table CDB-1. In step S202 in step S200, the CPU 43 waits for a SCSI command and analyzes a SCSI command, and sets the result in the first table CDB-1. In step S203 within step S200, the CPU 43 processes the command as a command analyzer.

Commands in the system include "RESET", "OPEN", "CLOSE", "MULTI-SEND", "SINGLE-SEND", "VERIFY", "FORMAT", "SEEK", "I/O CONTROL", etc. If the command is "VERIFY", then control goes to step S204 in which a process "VERIFY" is carried out. If the command is "FORMAT", then control goes to step S205 in which a process "FORMAT" is carried out. In step S203 as a command analyzer, after the command from the host computer 41 shown in FIG. 5 has been analyzed, a command converted into a command system that can be executed by the SFS 21 (in FIG. 4) is analyzed.

Figure 14:
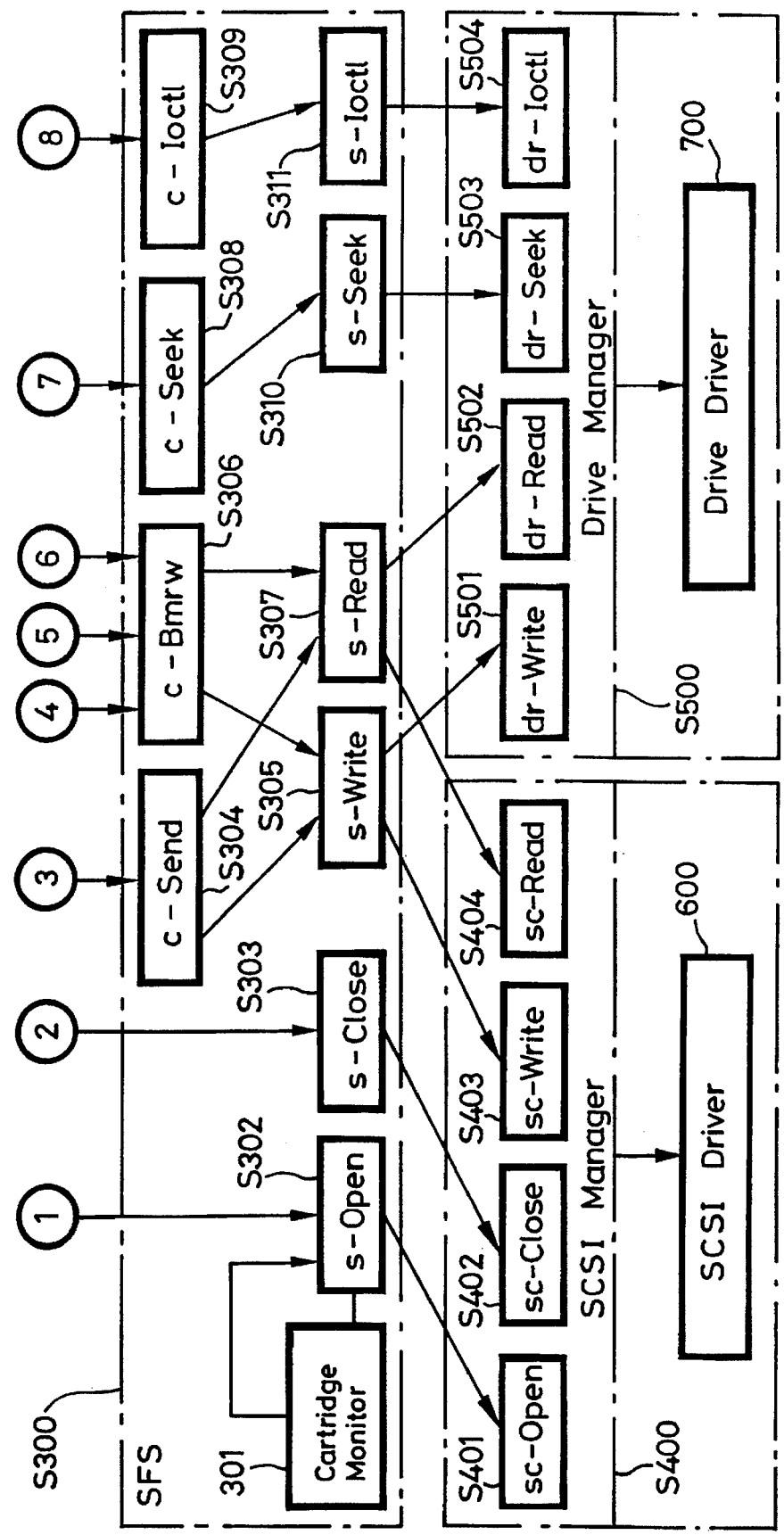

Those with "sc" in FIG. 14 (e.g., "sc-write") represent a SCSI. For example, "sc-write" means the transfer of data from a SCSI to the buffer memory 50 with a SCSI driver 600 and writing of the transferred data in the buffer memory 50. Those with "dr" in FIG. 14 (e.g., "dr-read") represent a drive. For example, "dr-read" represents the optical disk 53 (optical disc drive 42), and indicate the transfer of data from the buffer memory 50 to the optical disk 53 and writing of the transferred data on the optical disk 53.

"c-send" (called multi-send) indicates the transfer of data from a device to a device with two tasks using the buffer memory 50, such as the transfer of data from a SCSI to the buffer memory 50 and the transfer of data from the buffer memory 50 to a drive, for example.

"c-bmrw" (called single-send) indicates the transfer of data to the buffer memory 50 or from the buffer memory 50 to a device with one task, such as the transfer of data from a SCSI to the buffer memory 50, for example.

"s-open" indicates waiting for a command from the host computer 41. "s-close" means the end of a wait period for a command. "c-seek" indicates a seek command with no data transfer in a software sequence as an inlet on the SFS 21, and "s-seek" indicates a seek command with no data transfer in a software sequence as an outlet on the SFS 21 for transition to each device. "s-ioctl" indicates a command with no data transfer other than a seek command, e.g., a disk eject (discharging of the disk).

A command is awaited in step S202 within step S200. When an open command is issued to the SFS 21, control goes to "s-open" in step S302. In step S302, the open command is executed, and a task is started. At this time, the status of a cartridge is monitored by a cartridge monitor 301 (not shown in FIGS. 4 and 5), and the started task is awaited.

Then, the started task goes to a step S400 of a SCSI manager. In "sc-open" in a step S401 in the step S400, a command from the host computer 41 is awaited. An interrupt to wait for a command is handled by the SCSI driver 600. When a command from the host computer 41 is received, step S401 analyzes the command from the host computer 41, assigns the first table CDB-1 to a command code that can be recognized by the command analyzer S203, and to parameters according to command from host computer 41. Then, control goes through the step S302 back to the step S202.

It is assumed that the command from the host computer 41 is a write command, and the first table CDB-1 is set to "MULTI-SEND". At this time, the source ID is the SCSI and the destination ID is the optical disk drive 42.

Step S202 is followed by step S203. From step S203 as the command analyzer, control goes to the next step according to the command code in the first table CDB-1. Since the command is "MULTI-SEND", control goes to step S304.

Step S304 generates a memory allocation block MAB#0, a source second table #0, and a destination second table #0 according to the parameters in the first table CDB-1, and starts two tasks according to a source ID and a destination ID in the first table CDB-1. The started source task waits for the source ID and goes to step S305. Similarly, the started destination task waits for the destination ID and goes to step S307.

The source task that has gone to step S305 goes to step S403 within step S400 as the SCSI manager according to the source ID, and executes the process "sc-write" for writing data from the host computer 41 into the buffer memory 50 based on the memory allocation block MAB#0 and the second table #0. The step S400 is carried out by the SCSI driver 600. The source status in the memory allocation block MAB#0 is then set to information indicative of the completion of the writing process.

The destination task that has gone to step S307 goes to step S502 within step S500 as a drive manager according to the destination ID, and monitors the source status in the memory allocation block MAB#0. After having confirmed that the source task is normally ended, the destination task executes the process "dr-read" for writing data from the buffer memory 50 into the optical disk drive 42 based on the memory allocation block MAB#0 and the second table #0. Step S500 is carried out by a drive driver 700.

If the command from the host computer 41 is "READ", then the first table CDB-1 is also set to "MULTI-SEND". At this time, the source ID is the optical disk drive 42 and the destination ID is the SCSI.

Step S202 is followed by the step S203. From step S203 as the command analyzer, control goes to the next step specified by the command code in the first table CDB-1. Since the command is "MULTI-SEND", control goes to a step S304.

Step S304 generates a memory allocation block MAB#0, a source second table #0, and a destination second table #0 according to the parameters in the first table CDB-1, and starts two tasks according to a source ID and a destination ID in the first table CDB-1. The started source task waits for the source ID and goes to step S305. Similarly, the started destination task waits for the destination ID and goes to step S307.

The source task that has gone to step S305 goes to step S501 within step S500 as the drive manager according to the source ID, and executes the process "dr-write" for writing data from the optical disk drive 42 into the buffer memory 50 based on the memory allocation block MAB#0 and the second table #0. Step S500 is carried out by the drive driver 500. The source status in the memory allocation block MAB#0 is then set to information indicative of the completion of the writing process.

The destination task that has gone to the step S307 goes to step S404 within step S400 as the SCSI manager according to the destination ID, and monitors the source status in the memory allocation block MAB#0. After having confirmed that the source task is normally ended, the destination task executes the process "sc-read" for transferring data from the buffer memory 50 to the SCSI based on the memory allocation block MAB#0 and the second table #0. Step S400 is carried out by the SCSI driver 600.

The commands "SINGLE-SEND", "VERIFY", "FORMAT" will be described below. These commands are commands for transferring data only between the buffer memory 50 and the optical disk 53, without involving data transfer between the optical disk 53 and the host computer 41.

If the command from the host computer 41 is a buffer read command, then the first table CDB-1 is set to "SINGLE-SEND". This command represents a function to transfer the contents of the buffer memory 50 through the SCSI to the host computer 41. Therefore, the source ID is the buffer memory 50 and the destination ID is the SCSI. Then, control goes to step S306.

If the command from the host computer 41 is a verify command, then the first table CDB-1 is set to "VERIFY". Then, control goes to step S204. Since the command reads the data of a sector on the optical disk 53 which is indicated by the host computer 41 into the buffer memory 50, and sends an answer indicative of whether the data have normally been read to the host computer 41, the first table CDB-1 is set to "SINGLE-SEND", and the source ID is the optical disk 53 and the destination ID is the buffer memory 50. Then, control goes to step S306.

If the command from the host computer 41 is a format command, then the first table CDB-1 is set to "FORMAT". Then, control goes to step S205. The command is representative of a function to write particular data over the entire surface of the optical disk 53 and check the written data. When particular data are to be written, the particular data are transferred from the buffer memory 50 to the optical disk 53, and when particular data are to be checked, the particular data are transferred from the optical disk 53 to the buffer memory 50. Such a process repeated over the entire surface of the optical disk 53. The first table CDB-1 is set to "SINGLE-SEND". When the particular data are to be written, the source ID is the buffer memory 50 and the destination ID is the optical disk 53. When the particular data are to be read, the source ID is the optical disk 53 and the destination ID is the buffer memory 50. Then, control goes to step S306.

Step S306 generates a memory allocation block MAB#0, and then a source or destination second table #0 according to the parameters in the first table CDB-1, and starts one task. The started source or destination task goes with a source or destination ID to step S404 or S502. The process after the task has gone to these steps has already been described, and hence will not be repeated.

If the command is "SEEK", then control goes to step S308 in which c-seek for indicating "SEEK" is carried out. Thereafter, control goes to step S310 in which s-seek for indicating "SEEK" is carried out. After s-seek for indicating "SEEK" is carried out, control proceeds to step S503 within step S500 as the drive manager. In step S503, a seek process "dr-seek" is effected on the optical disk 53.

If the command is "I/O CONTROL", then control goes to step S309 within step S300 of the SFS 21 in which "I/O CONTROL" is indicated. Control then goes to step S311 in which "I/O CONTROL" is indicated. Thereafter, control goes to step S504 within step S500 as the drive manager in which an I/O control process dr-ioctol is effected on the optical disk drive 42.

When the data transfer or process is finished, the source/destination status in the first table CDB-1 is set to the result thereof. Then, control returns to step S203 as the command analyzer. When "CLOSE" is issued from step S203 in order to notify the host computer 41 of the result, control goes to step S303.

Then, control goes to step S400 as the SCSI manager. In step S402 within step S400, an ending process is carried out (a status phase of the SCSI is executed in this embodiment) based on the source/destination status in the first table CDB-1 by the SCSI driver 600. After step S402 is executed, control returns through step S203 to step S202 to wait for a command from the host computer 41.

As described above, the SFS 21 which operates on the drive control circuit 51 has the SCSI control circuit 48 or the SIO control circuit 47 as an input device for a command from the host computer 41 (a device for receiving an "OPEN" command in this embodiment). Data from the drive control circuit 41 are written in the buffer memory 50 by the memory driver 25 which operates on the DMA control circuit 49. Likewise, data are read from the buffer memory 50 into the SCSI control circuit 48, the SIO control circuit 47, or the drive control circuit 51 which serves as a destination by the memory driver 25 which operates on the DMA control circuit 49. Such an arrangement offers the following advantages:

First, with the SFS 21 interposed between the software system as the system controller 20 and the I/O driver 22, 23, or 24, the input/output functions of all modules can be uniformized, and hence all the modules can be designed independently of each other.

Secondly, in designing the software system as the system controller 20 for use in a storage apparatus, the I/O drivers 22, 23, 24 whose types and capabilities have become apparent can successively be designed. The function levels of the entire system at the time all the modules are completed do not depend upon the designing capability.

The third advantage is that when a bug occurs to the I/O driver 22, 23, or 24, or a software modification is made for a functional expansion, only a local portion of the software is required to be modified without affecting other portions thereof.

According to the fourth advantage, all I/O drivers can be used as modules in constructing a new system. Therefore, a new system can be constructed by newly designing an I/O driver which has been modified.

The fifth advantage is that the multitask monitor 30 can handle an infinite number of I/Os with the finite number of tasks that can be controlled by the multitask monitor 30.

According to the sixth advantage, a system having a plurality of I/O drivers 22, 23, 24 for receiving a command from an external source can be operated in the same manner from any of the I/O drivers 22, 23, 24. For example, a process of reading data from the optical disk 53 through the I/O drivers 22, 23, 24 of the SCSI control circuit 48 can be carried out by the I/O drivers 22, 23, 24 of the SIO control circuit 47.

The seventh advantage is that each I/O device can execute a command without concern over a companion I/O device. More specifically, with respect to sc-write/sc-read or dr-read/dr-write shown in FIG. 14, for reading data from the optical disk 53, the data are transferred from the optical disk 53 to the buffer memory 50 and written in the buffer memory 50 by dr-write, and the data are read from the buffer memory 50 and supplied through the SCSI control circuit 48 to the host computer 41 by sc-read. For writing data on the optical disk 53, the data supplied from the host computer 41 through the SCSI control circuit 48 are written in the buffer memory 50 by sc-write, the written data are read from the buffer memory 50 by dr-read, and the read data are written on the optical disk 53.

Since the software of a data transfer protocol can be generated taking into account only the relationship between each I/O driver (e.g., sc-read, sc-write, dr-read, dr-write) and the buffer memory 50, the I/O drivers can be generated independently of each other. Data are actually transferred, e.g., from the optical disk 53 to the host computer 41 by controlling the independently generated I/O drivers. Even though the I/O drivers are generated independently of each other, the independently generated I/O drivers are controlled for data transfer by the SFS 21. Consequently, the I/O drivers can be generated independently of each other taking into account only the relationship between each I/O driver and the buffer memory 50 in software development.

Having described a preferred embodiment of the invention with reference to the accompanying drawings, it is to be understood that the invention is not limited to that precise embodiment and that various changes and modifications could be effected by one skilled in the art without departing from the spirit or scope of the invention as defined in the appended claims.

What is claimed is:

1. A data transmission apparatus comprising:

a first interface for interfacing a data signal in response to a command from at least one external device;

first interface control means for controlling said first interface;

a second interface for interfacing at least one data signal;

second interface control means for controlling said second interface;

memory means for temporarily storing the data signals;

first control means connected to said first interface and said second interface; and second control means connected to said first control means;

wherein said first interface control means generates a first table based on a command supplied to said first interface and supplies the first table to said second control means, wherein said second control means determines whether said command causes data transfer based on said first table, and controls said first control means to analyze said command if said command causes data transfer, wherein said first control means generates memory information including access position information with respect to said memory means based on said first table, first address information with respect to one of the first and second interfaces which serves as a source of a data signal, and second address information with respect to one of the first and second interfaces which serves as a destination of a data signal, wherein one of the first and second interface control means which corresponds to said one of the first and second interfaces which serves as a source of a data signal supplies a data signal to and stores the data signal in said memory means based on said first address information and said access position information, and wherein one of the first and second interface control means which corresponds to said one of the first and second interfaces which serves as a destination of a data signal reads the data signal from said memory means and outputs the data signal through said one of the first and second interfaces based on said second address information and said access position information.

2. A data transmission apparatus according to claim 1, wherein said first table contains information indicative of whether said command causes data transfer, information indicative of an amount of data to be transferred, information indicative of said one of the first and second interfaces which serves as a source of a data signal, and information indicative of said one of the first and second interfaces which serves as a destination of a data signal.

3. A data transmission apparatus according to claim 1, wherein said memory information contains information indicative of said one of the first and second interfaces which serves as a source of a data signal, and information indicative of said one of the first and second interfaces which serves as a destination of a data signal.

4. A data transmission apparatus according to claim 1, wherein said one of the first and second interfaces which serves as a destination of a data signal is connected to a data storage apparatus.

5. A data transmission apparatus according to claim 4, wherein said data storage apparatus comprises an optical disk drive.

6. A method of transmitting data, comprising the steps of:

(a) receiving a command from at least one external device with a first interface;

(b) supplying said command to first interface control means for controlling said first interface;

(c) generating a first table with said first interface control means and supplying the first table to a second control means;

(d) determining, with said second control means, whether said command causes data transfer based on said first table;

(e) analyzing, with first control means, said command if said command causes data transfer as determined in said step (d);

(f) generating, with said first control means, access position information with respect to memory means based on said first table, first address information with respect to one of the first interface and a second interface which serves as a source of a data signal, and second address information with respect to one of the first and second interfaces which serves as a destination of a data signal;

(g) storing, with one of the first interface control means and second interface control means which corresponds to said one of the first and second interfaces which serves as a source of a data signal, a data signal in said memory means based on said first address information and said access position information; and (h) reading, with one of the first and second interface control means which corresponds to said one of the first and second interfaces which serves as a destination of a data signal, a data signal from said memory means and outputting the data signal through said one of the first and second interfaces based on said second address information and said access position information.

* * * * *